(No Model.)
E. W. WILSON.
DETACHABLE BICYCLE SEAT FOR CHILDREN.
No. 551,068. Patented Dec. 10, 1895.
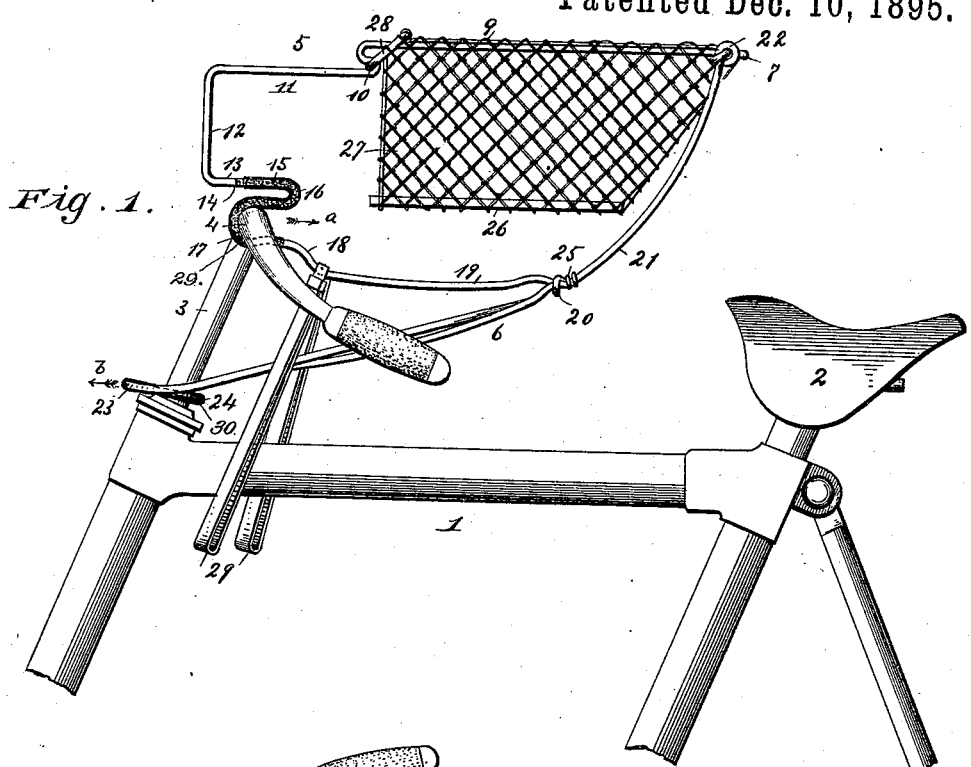
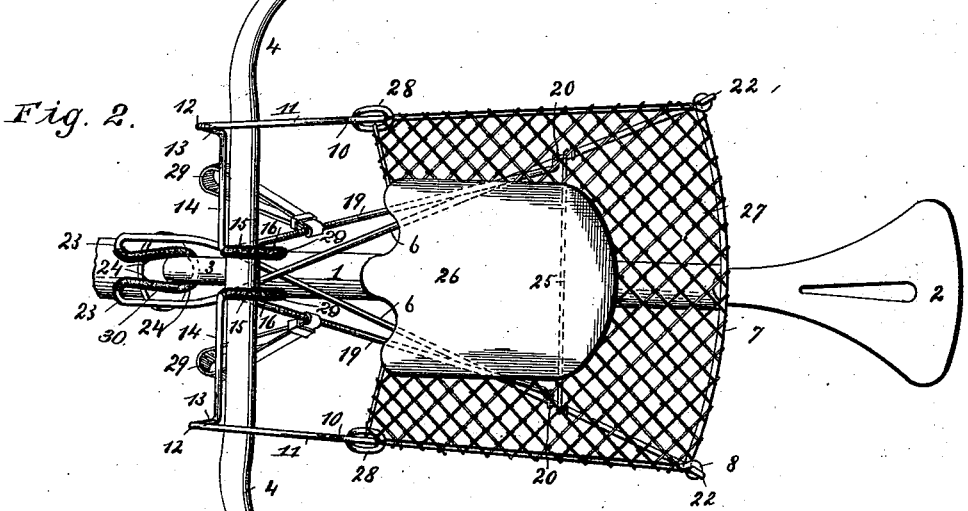
Witnesses:
F. G. Fischer
G. Y. Thorpe
Inventor:
Ele W Wilson
By Hixon & Hixon
Attys.

United States Patent Office.

ELE W. WILSON, OF SMITHVILLE, MISSOURI.

DETACHABLE BICYCLE-SEAT FOR CHILDREN.

SPECIFICATION forming part of Letters Patent No. 551,068, dated December 10, 1895.

Application filed March 14, 1895. Serial No. 541,824. (No model.)

*To all whom it may concern:*

Be it known that I, ELE W. WILSON, of Smithville, Clay county, Missouri, have invented certain new and useful Improvements in Detachable Bicycle-Seats for Children, of which the following is a full, clear, and exact description, reference being had to the accompanying drawings, forming a part thereof.

My invention relates to seat attachments for bicycles, and more particularly to seats for small children, which are detachably carried in advance of the seat of the person propelling the machine; and the object of my invention is to provide a seat of this character which may be easily and quickly placed in or removed from position, and which is simple, strong, durable, and inexpensive of construction.

With these objects in view the invention consists in certain peculiar and novel features of construction and combinations of parts, as will be hereinafter described and claimed.

In order that the invention may be fully understood, I will proceed to describe it with reference to the accompanying drawings, in which—

Figure 1 represents in side elevation the upper portion of a bicycle-frame and a seat mounted thereon embodying my invention. Fig. 2 is a top plan view of the same.

In the said drawings, 1 designates the upper bar of a bicycle-frame; 2, the ordinary seat at the rear end thereof; 3, the steering-head bar, and 4 the handle-bars, of a bicycle of the usual or any preferred construction, and mounted upon said handle-bars and said steering-head bar is a seat-supporting framework, which comprises two sections of heavy or stiff spring-wire 5 and 6 suitably joined together, as will be presently explained.

The section 5 comprises the transversely-extending curved portion 7, which projects an equal distance beyond each side of the bar 1 of the framework, and is located contiguous to the seat 2 and a suitable distance thereabove. At the opposite ends of said portion 7 are formed the eyes 8, and converging slightly toward the front of the machine are the arms 9 9, which at a suitable distance in rear of the handle-bar are bent downward to goose-neck or S form, as shown at 10. Extending forwardly from said goose-neck bends a suitable distance beyond the handle portions are the arms 11, and extending vertically downward from the forward ends of the same are the vertical portions 12, which are bent rearward slightly, as at 13, and then continue inward parallel with and above the handle-bars until the contiguous ends of the portions 14 are apart a distance slightly exceeding the diameter of the steering-head bar. They are then bent rearward, as at 15, and vertically downward to goose-neck form, as shown at 16, so as to provide the rearwardly opening or disposed loops 17, which fit snugly against the front and top and bottom sides of the handle-bars at opposite sides of the steering-head bar. From said loops 17 the wire extends divergently rearward and downward to form the bends 18 and the approximately-horizontal portions 19, which are provided with eyes 20 in their rear ends embracing tightly the kinks or slight bends in the forwardly-converging arms 21 of the section 6. Said arms curve upwardly at their rear ends and are provided with eyes 22, which engage the eyes 8 at the junction of the portions 7 and 9 of the section-frame 5. A slight distance rearward of the handle-bar said forwardly-converging arms 21 cross each other or intersect and continue forward at opposite sides of the steering-head bar 3. They are then bent rearwardly, as at 23, so as to form the forwardly-disposed loop 24, which embraces snugly and tightly the rear and opposite sides of said steering-head bar, as shown most clearly in Fig. 2. The converging arms 21 of the lower section 6 are braced apart and tied together by the wire rod 25, which is coiled around said arms contiguous to and rearward of their point of junction with the portions 19 of the upper section.

A detachable seat 26, of wood or any other suitable material, is supported from the portion 7 and the arms 9 of the upper section of the framework by the netting 27, which may be of any flexible material, which is looped or otherwise slidingly attached to the arms 9 at its upper end. Said netting is held in its expanded position, as shown in the drawings, and prevented from accidental retraction, whereby the occupant may be dislodged from position and injured by a fall, by means of rings 28, which slip over the upper portion of the goose-necks and engage the lower or forwardly-disposed loops thereof, as shown clearly in Fig. 1. It is necessary to employ a retractible seat if suspended in the manner described. Otherwise the seat-frame could not be conveniently placed in or removed from position, as a rather peculiar manipulation of the frame is necessary to accomplish the purpose. To place it in position it is necessary to slip one of the handles—for instance, the one to the right of the machine—transversely and horizontally through the space bounded at its upper and lower sides by the arm 9 and the portion 19 of the right-hand portion of the upper section of the framework until the vertical portion 12 at the corresponding side of the framework comes in contact with the steering-head bar 3. It is then manipulated so that the other handle passes through the corresponding space of the upper section of the framework at its opposite side—that is, down and outwardly through the space bounded at its upper and lower sides by the left-hand arm 9 and the left-hand portion 19. The framework is then slipped laterally and centered over the bar 1 of the machine, so that the steering-head shall be opposite the forwardly-disposed loop of the lower section and the space between the approximately parallel goose-necks 16 of the upper section. The upper section is now moved forward, causing the forwardly-converging portions 18, which terminate in the goose-necks 16, to move laterally further apart until the mouths of the rearwardly-disposed loops 17 are in advance of the handle portions 4. The framework is then moved slightly upward until the said rearwardly-disposed loops are opposite the front side of the handle-bars. The framework is now operated pivotally, the upper section moving rearwardly in the direction indicated by the arrow $a$ and the lower section in the direction indicated by the arrow $b$, which causes the rearwardly-disposed and forwardly-disposed loops 17 and 24, respectively, to engage snugly and tightly the handle-bars 4 and the steering-head bar 3. The mouths or openings of the loops 17 and the mouth of the loop 23 are slightly narrower than the diametric width of the handle-bars and the steering-head bar, respectively. The netting forming the flexible portion of the seat is now slipped forwardly and the seat proper 26 placed therein.

If desired, of course, a flexible seat in place of the wooden seat described may be used.

To remove the framework it is necessary to reverse the operation already described, which can be done in a moment or two. In order to provide stirrups or supports for the feet of the child, I attach loops 29 to the portions 19, contiguous to the upwardly-bent portions 18, which prevent the forward pressure exerted by the child's feet from forcing the straps out of position. These straps may be made in any suitable manner, preferably, for cheapness, of flexible straps of leather or any other suitable material.

It will be seen by reference to Fig. 1 that the greater the pressure upon the seat the more firmly will the framework be established upon the machine.

To prevent scratching or other marring of the nickel-plate or other ornamental coating of the handle and steering-head bars, I employ tubes of rubber or equivalent material $29^a$, which fit snugly upon the goose-neck portions 16 of the framework, and the tube 30, which fits in a similar manner upon the portion of the framework forming the forwardly-disposed loop 24, engaging the steering-head bar.

Having thus described my invention, what I claim as new, and desire to secure by Letters Patent, is—

1. A detachable seat for bicycles, comprising an upper section and a lower section suitably joined together; the upper section having a rearwardly-disposed loop for engagement with the handle-bars at the opposite sides of the steering-head bar, and the lower section having a forwardly-disposed loop for engagement with said steering-head at a suitable distance below said handle-bars, and a seat proper carried by said upper section, substantially as set forth.

2. A detachable seat for bicycles, comprising an upper and a lower section formed of spring-metal rods and suitably joined together, and consisting of an upper section which is bent to form goose-necks having rearwardly-disposed loops for engagement with the handle-bar of a bicycle, and a lower section also of spring-metal wire, provided with a forwardly-disposed loop to engage the steering-head below the handle-bars, and a flexible and retractible seat-support suspended from and within the upper section of the framework, substantially as set forth.

3. A detachable seat for bicycles comprising a suitable framework of spring-metal rods, consisting of an upper section comprising a body-portion, side-arms, side-portions, and goose-neck bends and vertical portions connecting said side-arms and said side-portions so as to form rearwardly-disposed loops to engage the handle-bar of a bicycle at opposite sides of the steering-head bar, and a lower section, comprising intersecting arms which diverge rearwardly and forwardly from said point of intersection, and are provided at their front ends with a forwardly-disposed loop to engage the steering-head bar of the bicycle, and engage at their upper and rear ends with the upper section at the junction of its side-arms with its back-portion, and engage also with the side-portions of said upper section, a cross-bar connecting said rearwardly-diverging portions of said intersecting arms, and a netting of flexible material slidingly attached at its upper ends to the side-arms and attached at its rear end to the back portion of said upper section, substantially as set forth.

4. A detachable seat for bicycles, comprising a suitable framework of spring-metal rods, consisting of an upper section, comprising a body-portion, side-arms, side-portions, and goose-neck bends and vertical portions connecting said side-arms and said side-portions so as to form rearwardly-disposed loops to engage the handle-bar of a bicycle at opposite sides of the steering-head bar, and a lower section, comprising intersecting arms which diverge rearwardly and forwardly from said point of intersection, and are provided at their front ends with a forwardly-disposed loop to engage the steering-head bar of the bicycle, and engaging at their upper and rear ends with the upper section at the junction of its side-arms with its back-portion, and engaging also with the side-portions of said upper section, a cross-bar connecting said rearwardly-diverging portions of said intersecting arms, a netting of flexible material slidingly attached at its upper ends to the side-arms and attached at its rear end to the back portion of said upper section, and swinging straps or loops carried by said side-portions of the upper section contiguous to the said goose-necks, substantially as set forth.

5. A detachable seat for bicycles, comprising an upper section and a lower section suitably joined together; said lower section being provided with a forwardly-disposed loop to engage the steering-head bar, and said upper section being provided with rearwardly-disposed loops to engage the handle-bars at opposite sides of the steering-head bar, and also provided with goose-necks to form fowardly-disposed loops, a retractible seat suspended from said upper section, and provided at its front corners with rings which detachably engage the forwardly-disposed loops of said last-mentioned goose-necks, and rubber tubes fitting upon the parts of the framework which contact with the handle-bars and the steering-head bar, substantially as and for the purpose set forth.

In testimony whereof I affix my signature in the presence of two witnesses.

ELE W. WILSON.

Witnesses:
G. Y. THORPE,
M. R. REMLEY.